United States Patent
Sevagen et al.

(10) Patent No.: US 10,161,481 B2
(45) Date of Patent: Dec. 25, 2018

(54) DEVICE WITH TWO INTERLOCKED GEAR TRAINS

(71) Applicant: SAFRAN ELECTRONICS & DEFENSE, Boulogne Billancourt (FR)

(72) Inventors: Bertrand Sevagen, Boulogne Billancourt (FR); Marc Lebrun, Boulogne Billancourt (FR)

(73) Assignee: SAFRAN ELECTRONICS & DEFENSE, Boulogne-Billancourt (FR)

(*) Notice: Subject to any disclaimer, the term of this patent is extended or adjusted under 35 U.S.C. 154(b) by 0 days.

(21) Appl. No.: 15/105,248

(22) PCT Filed: Dec. 3, 2014

(86) PCT No.: PCT/EP2014/076463
§ 371 (c)(1),
(2) Date: Jun. 16, 2016

(87) PCT Pub. No.: WO2015/090977
PCT Pub. Date: Jun. 25, 2015

(65) Prior Publication Data
US 2016/0319910 A1    Nov. 3, 2016

(30) Foreign Application Priority Data
Dec. 19, 2013   (FR) ...................................... 1363119

(51) Int. Cl.
*F16H 1/46*   (2006.01)
*F16H 1/28*   (2006.01)

(52) U.S. Cl.
CPC ............. *F16H 1/46* (2013.01); *F16H 1/2863* (2013.01); *F16H 2001/2872* (2013.01); *F16H 2001/2881* (2013.01)

(58) Field of Classification Search
None
See application file for complete search history.

(56) References Cited

U.S. PATENT DOCUMENTS

| 4,742,730 A | 5/1988 | Dorn et al. |
| 4,856,379 A * | 8/1989 | Jafarey ................... B64C 13/28 403/356 |
| 5,120,285 A * | 6/1992 | Grimm ................... B64C 13/28 475/205 |
| 6,783,478 B2 * | 8/2004 | Larson ..................... F16H 1/46 475/330 |
| 2005/0250614 A1 | 11/2005 | Lumpkin et al. |

FOREIGN PATENT DOCUMENTS

| EP | 0826902 A2 | 3/1998 |
| EP | 1398526 A2 | 3/2004 |
| FR | 2286986 A1 | 4/1976 |

* cited by examiner

*Primary Examiner* — Erin D Bishop
(74) *Attorney, Agent, or Firm* — Muncy, Geissler, Olds & Lowe, P.C.

(57) ABSTRACT

A gear device, wherein it comprises at least: a shaft provided with a sun gear; at least two coaxial rings with internal teeth, namely at least one first ring and at least one second ring having at least one first annular segment and at least one second annular segment; and planets engaging with the sun gear, the first ring, and the segments of the second ring, which segments mesh with a particular toothed relationship.

10 Claims, 5 Drawing Sheets

DEVICE WITH TWO INTERLOCKED GEAR TRAINS

BACKGROUND OF THE INVENTION

Field of the Invention

The present invention relates to a device having nested gear trains.

Brief Discussion of the Related Art

Epicyclic gear trains are known that comprise an inner sun gear with external teeth, and outer ring gear with internal teeth, and planets having external teeth mounted between them on a planet carrier that is mounted to pivot relative to the sun gear and to the ring. In operation, one of the sun gear and the ring gear is held stationary with the other one of them and the planet carrier constituting the inlet and the outlet of the gear train, or vice versa. Thus, each point on each planet describes an epicyclic path, from which the name for this type of gear train is derived. The transmission ratio between the inlet and the outlet depends on the numbers of teeth on the ring and sun gears and on the planets and it may reach a value of about ten. This type of gear train is advantageous because of its transverse size (limited to the size of the ring) and because of its good efficiency. The maximum transmissible torque depends on the number of planets actually engaged with the ring and sun gears.

In order to increase the number of planets, and thus the maximum transmissible torque, proposals have been made to omit the planet carrier.

Gear trains are thus known that are said to be "nested" that comprise: a primary shaft having a sun gear, a stationary ring, a movable ring, and planets each provided with an inlet first segment engaging respectively with the sun gear and with one of the two rings and a second segment engaging with the other ring. The primary shaft and the movable ring constitute the inlet and the outlet of the gear train, or vice versa. The transmission ratio is determined by the numbers of teeth of the sun gear, of each of the two segments of the planets, and of each of the two rings. Nested gear trains possess maximum transmissible torque that is greater than is possible with conventional epicyclic gear trains, but they are less efficient.

In addition, when the numbers of teeth on the two planet segments are different, machining the toothed segments by cutting needs to be performed with machining being restarted several times over. Unfortunately, assembly constraints require that each of the toothed segments has at least one tooth in mutual alignment with accuracy that it is difficult to achieve after cutting. Furthermore, machining the toothed segments by cutting also requires grooves of large width between the toothed segments in order to enable the cutter tool to be disengaged. Nevertheless, such grooves are generally too small to enable a grindwheel to be disengaged, and they thus prevent any subsequent grinding stage, thereby limiting machining accuracy. The level of quality that can thus be obtained puts a limit on the maximum transmissible torque since the distribution of load applied on each of the gears in the gear train is unbalanced.

BRIEF SUMMARY OF THE INVENTION

An object of the invention is to provide a nested gear train that presents better performance in terms of maximum transmissible torque.

To this end, the invention provides a gear device that comprises at least:
a shaft having a sun gear;
at least two coaxial rings with internal teeth, namely at least one first ring and a second ring having at least a first annular segment and a second annular segment;
first planets, each provided with at least a first toothed segment engaging the sun gear, the first ring, and the first segment of the second ring; and
second planets, each provided with at least a first toothed segment engaging the sun gear, the first ring, and the second segment of the second ring.

The sum of the number of teeth of the first ring plus the number of teeth of the sun gear is a multiple of the product of the number of first planets multiplied by the number of segments of the second ring, and the sum of the number of teeth of the second ring plus the number of teeth of the sun gear is a multiple of the number of first planets.

The first annular segment and the second annular segment have identical teeth and present between them an angular offset corresponding to a number of teeth that is the reciprocal of the number of segments of the second ring.

Thus, the device can be thought of as a plurality of nested gear trains (two nested gear trains when there are two segments in the second ring), that are themselves nested one in the other. Each planet meshes on the first ring and on one of the annular segments of the second ring. Each of the planet segments can be considered as a single toothed segment. The center-to-center distance between the planets and the rings which have different numbers of teeth is ensured by suitable setbacks on the teeth. The single toothed segment of each planet can thus be obtained by grinding. The level of quality that can be obtained by this method of machining is much greater than that which can be obtained by cutting, such that the device can withstand large loads.

In a particular embodiment, the first ring has a first annular segment and a second annular segment arranged on either side of the second ring, each planet being provided with a second toothed segment separated from the first toothed segment by a distance that is greater than the width of the annular segment of the second ring with which the first toothed segment is not engaged, such that the first toothed segment of each of first planet engages with the first annular segment of the first ring and with the first annular segment of the second ring, the second toothed segment of each first planet engages with the second annular segment of the first ring, the first toothed segment of each second planet engages with the second annular segment of the first ring and with the second annular segment of the second ring, and the second toothed segment of each second planet engages with the first annular segment of the first ring.

Thus, the train is made symmetrical by the arrangement of the first ring and two annular segments that are placed symmetrically relative to the join plane between the two segments of the second ring, and by adding segments on each of the planets in such a manner that the first planets and the second planets, which are arranged in alternation and opposite ways round, are engaged with the two annular segments of the first ring. The number of teeth transmitting load is thus increased and tilting of the planets is canceled.

Finally, incorporating a resilient backlash take-up device between the two segments of the second ring or between two segments of the first ring or between two segments of the sun gear, one segment meshing on the first and second planets and the other segment meshing on the second planets, makes it possible to obtain a nested gear train without backlash. It is capable of transmitting torque corresponding to the capacity of one train minus the load applied by the resilient element on the other train (the first planets transmit the load, the second planets trailing).

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DISCUSSION OF THE PREFERRED EMBODIMENTS

Figure 1:
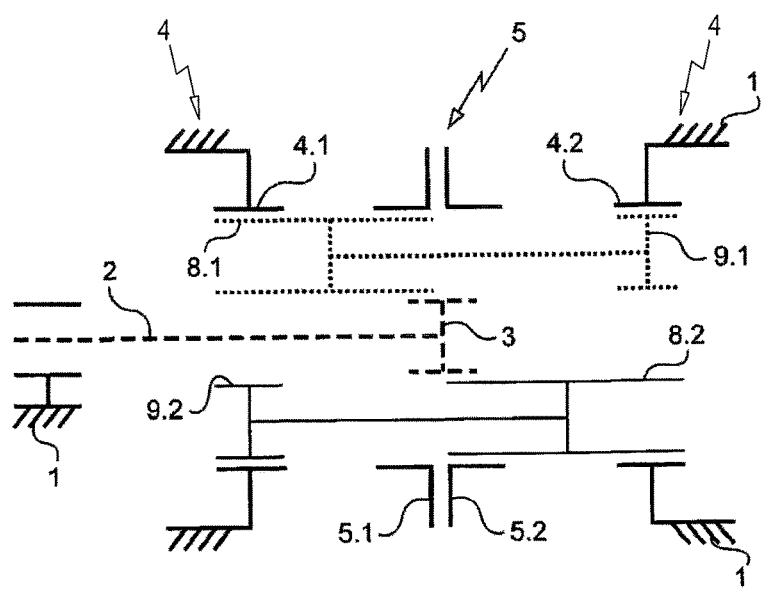
FIG. 1 is a kinematic diagram showing a device in a first embodiment of the invention.
Figure 3:
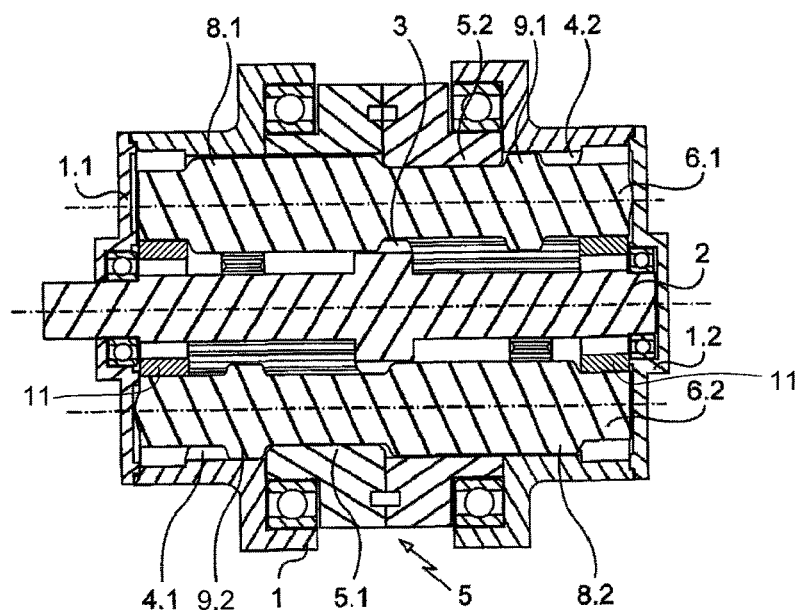
FIG. 3 is a view of the device in section on plane III of FIG. 2.
Figure 2:
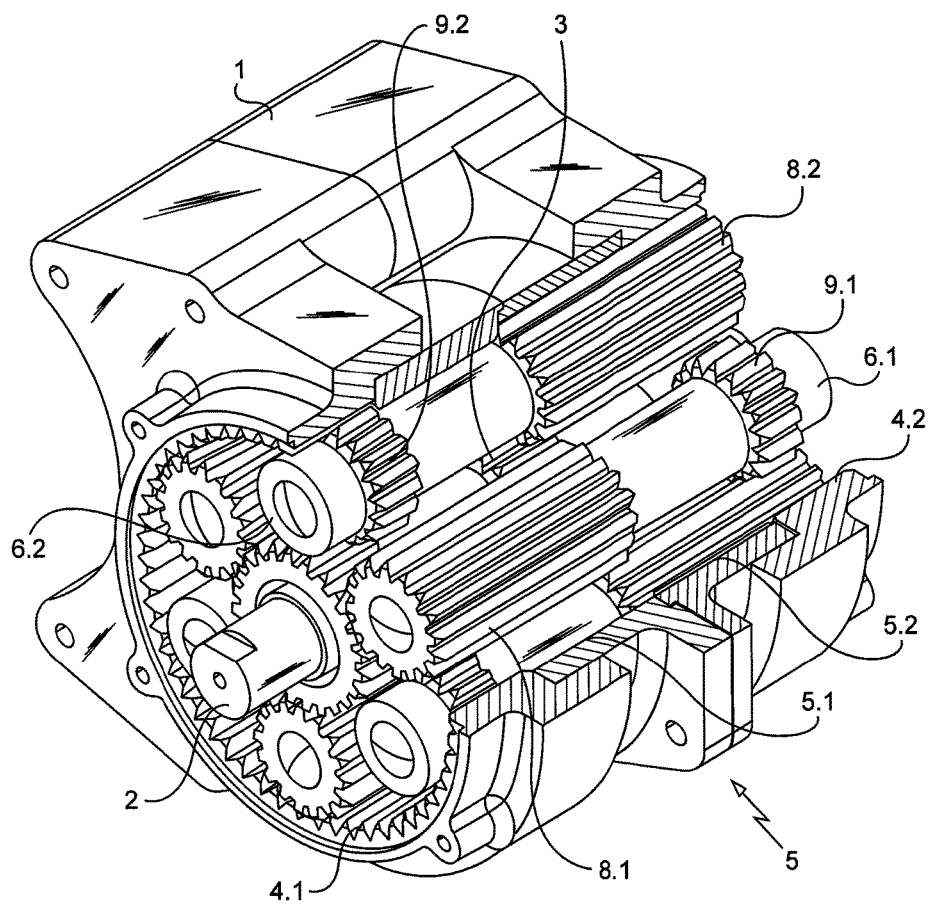
FIG. 2 is a cutaway perspective view of the device.

By way of example, the device of the invention may be associated with a gear motor in order to form an actuator. By way of example, such an actuator can be used for moving a flight control surface of an aircraft. With reference to FIGS. 1 to 4, the gear device of the invention comprises a frame 1 having mounted thereon:
 a shaft 2 provided with a sun gear 3;
 two rings 4 and 5 with internal teeth that are arranged coaxially around the shaft 2; and
 first planets 6.1 and second planets 6.2 mounted between the rings and the sun gear 3 in order to extend parallel to the shaft 2 and rotate around the shaft 2.

The ring 4 has a first annular segment 4.1 and a second annular segment 4.2 having means for fastening them relative to each other and for fastening them to a stationary structural portion of the airplane, e.g. by bolts.

Frame-forming endpieces 1.1 and 1.2 are mounted on the annular segments 4.1 and 4.2 in order to close them. The endpieces 1.1 and 1.2 contribute to confining the device as a whole.

The shaft 2 is mounted on the endpieces 1.1 and 1.2 to pivot about the central axis of the assembly, and opposite from the sun gear 3 it possesses an end that is arranged to be connected in rotation with the outlet shaft of the motor, e.g. by keying, a coupling joint, cottering, etc.

The ring 5 is arranged between the annular segments 4.1 and 4.2. The ring 5, or central ring, is mounted on two bearings connected to the annular segments 4.1 and 4.2 so as to pivot about the central axis of the assembly: in this example, the ring 5 is connected to the two annular segments 4.1 and 4.2 by ball bearings. The ring 5 has a first annular segment 5.1 facing the annular segment 4.1 and a second annular segment 5.2 facing the annular segment 4.2. The annular segments 5.1 and 5.2 have identical teeth and they are connected to each other with an angular offset of half a tooth. In this example, each of the annular segments 5.1 and 5.2 of the ring 5 has a respective crank arm connected to the flight control surface, e.g. by bolts, the crank arm of one of the two annular segments 5.1, 5.2 having an orifice for passing a bolt of section that is greater than the cross-section of the bolts so as to accommodate an angular offset.

In this example, the first planets 6.1 are three in number, and each of them has a first toothed segment 8.1 engaging the sun gear 3, the annular segment 4.1, and the annular segment 5.1 of the central ring 5, and a second tooth segment 9.1 engaging the annular segment 4.2. The first toothed segment 8.1 and the second toothed segment 9.1 of each planet 6.1 are spaced apart by a distance greater than the width of the annular segment 5.2 with which the first toothed segment 8.1 is not engaged.

The second planets 6.2 are three in number and each of them is provided with at least a first toothed segment 8.2 engaging the sun gear 3, the annular segment 4.2, and the second annular segment 5.2 of the central ring 5, and a second toothed segment 9.2 engaging the annular segment 4.1. The first toothed segment 8.2 and the second toothed segment 9.2 of each planet 6.2 are spaced apart by a distance greater than the width of the annular segment 5.1 with which the first toothed segment 8.2 is not engaged. In summary, the second planets are identical to the first planets.

The planets are here radially supported by conventional rolling rings 11.

The number of teeth of the annular segment 5.1 is identical to the number of teeth of the annular segment 5.2. The sum of the number of teeth of the sun gear 3 plus the number of teeth of one or the other of the annular segments 5.1, 5.2 of the ring 5 is equal to a multiple of the number of first planets 6.1 (the number of first planets 6.1 being identical to the number of second planets 6.2).

The number of teeth of the annular segment 4.1 is identical to the number of teeth of the annular segment 4.2. The number of teeth of each annular segment 4.1, 4.2 is different from the number of teeth of the segments 5.1 and 5.2, and the sum of the number of teeth of the sun gear 3 plus the number of teeth of one or the other of the annular segments 4.1 or 4.2 is equal to a multiple of the total number of planets 6.1, 6.2 (i.e. a multiple of six in this example). The sum of the number of teeth of the first ring 4 (i.e. the number of teeth of the first annular segment 4.1 plus the number of teeth of the second annular segment 4.2 in this example) plus the number of teeth of the sun gear 3 is a multiple of the product of the number of first planets 6.1 multiplied by the number of segments of the second ring 5.

By the effect of the segment 8.1, the presence of the planets 6.1 constrains the teeth of the annular segment 4.1 and of the first annular segment 5.1 of the ring 5 to be in alignment with one another. By the effect of the segment 8.2, the presence of the planets 6.2 constrains the teeth of the annular segment 4.2 and of the second segment 5.2 of the ring 5 to be in alignment with one another.

By way of example, the numbers of teeth are as follows:
 24 for the sun gear 3;
 54 for the annular segments 4.1, 4.2;
 57 for the annular segments 5.1, 5.2; and
 16 for the toothed segments 8.1, 8.2, 9.1, 9.2.

In summary, the various numerical characteristics are associated with one another by the following relationships:

the number of first planets 6.1 (or of second planets 6.2) is a common divisor both of the sum of the number of teeth of the ring 5 plus the number of teeth of the sun gear 3, and also the sum of the number of teeth of the annular segments 4.1, 4.2 plus the number of teeth of the sun gear 3; and the number of teeth of the ring 5 is not equal to the number of teeth of the annular segments 4.1, 4.2.

Preferably:

the maximum number of planets 6.1, 6.2 is equal to the greatest common divisor of the number of teeth of the sun gear 3 and of the number of teeth of the annular segments 4.1, 4.2; and the maximum number of first planets 6.1 (or of second planets 6.2) is equal to the greatest common divisor of the number of teeth of the ring 5 and of the number of teeth of the annular segments 4.1, 4.2.

Figure 4:
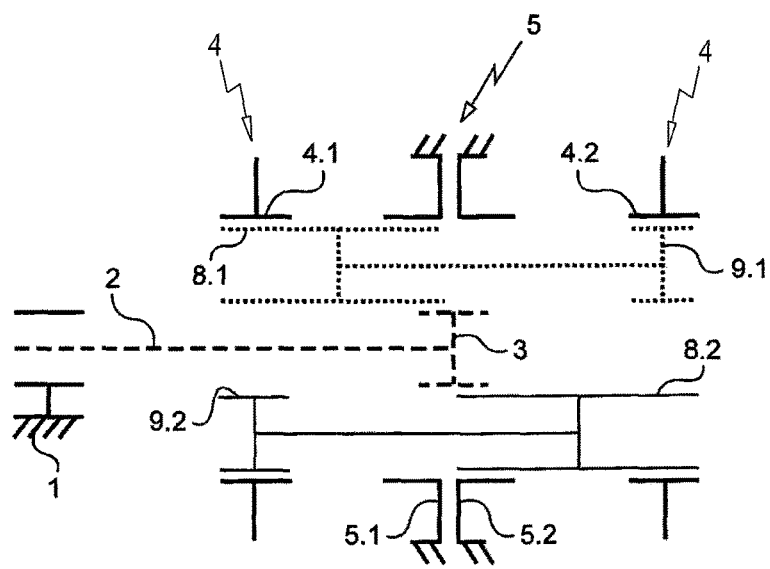
FIG. 4 is a kinematic diagram showing a device in a second embodiment of the invention.

With reference to FIG. 4, the device of the second embodiment comprises, as in the first embodiment:

two endpieces 1.1, 1.2;
a shaft 2 having a sun gear 3;
two rings 4 and 5 that are arranged coaxially around the shaft 2; and
first planets 6.1 and second planets 6.2 mounted between the rings and the sun gear 3 to extend parallel to the shaft 2 and to rotate around the shaft 2.

Nevertheless, in the second embodiment, the central ring 5 is stationary relative to the stationary structural portion of the aircraft, and the outer annular segments 4.1 and 4.2 are connected to the flight control surface and are movable relative to the stationary structural portion of the aircraft.

Naturally, the invention is not limited to the embodiments described, but covers any variant coming within the ambit of the invention as defined by the claims.

In particular, the general structure of the device may be modified.

The number of planets may be different from that described: for example it may be nine. Under such circumstances, the central ring has three annular segments that are offset relative to one another by one-third of a tooth. The sum of the number of teeth of the sun gear plus the number of teeth of the outer ring is equal to a multiple of nine, and the sum of the number of teeth of the sun gear plus the number of teeth of each annular segment of the central ring is equal to a multiple of three.

Figure 8:
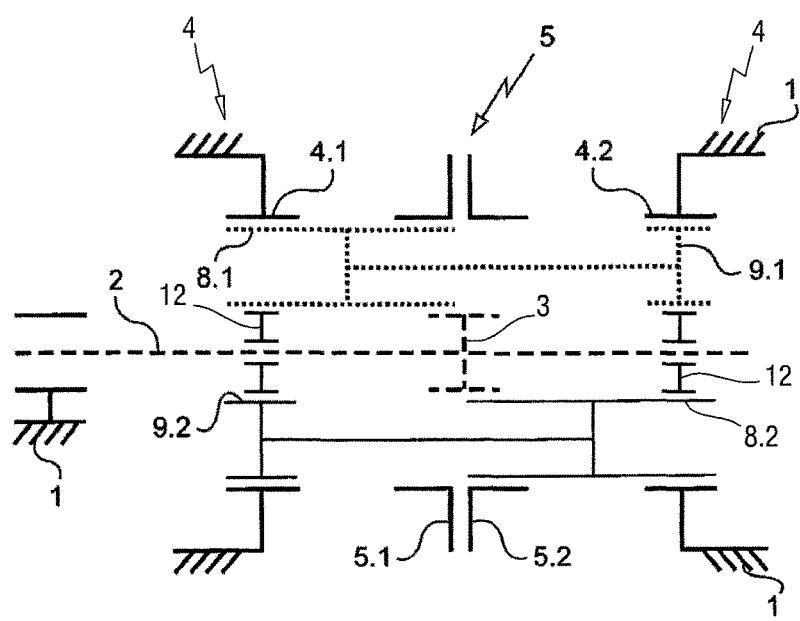
FIG. 8 is a kinematic diagram similar to FIG. 1 showing idlers gear to hold radial planets.

As illustrated at FIG. 8, it is possible to make provision for idler gears 12 on the shaft in order to support the planets while holding them radially in position.

The numbers of teeth may be modified so long as the formulas given above are complied with.

The device need have only one outer ring 4.

A variant of the device has a backlash take-up system between the two segments of the second ring or between the two segments of the first ring or between the two segments of the sun gear, one meshing with the first planets and the other meshing with the second planets.

Figure 5:
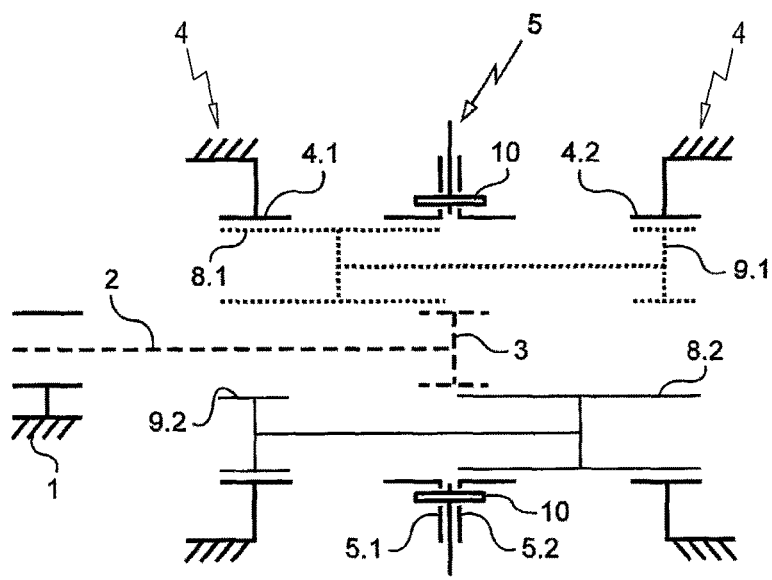
FIG. 5 is a kinematic diagram showing a device having a backlash take-up member between two segments of the second ring, in a first variant of the backlash take-up member.

With reference to FIG. 5, the system comprises a backlash take-up member in the form of a resilient annular element 10 rotatably connecting the segments 5.1, 5.2 to the outlet. By virtue of its resilience, the resilient annular element 10 applies torque between the segments 5.1 and 5.2 via the outlet 5 so as to take up any backlash that exists between the other components of the device in connection with the gearing.

Figure 6:
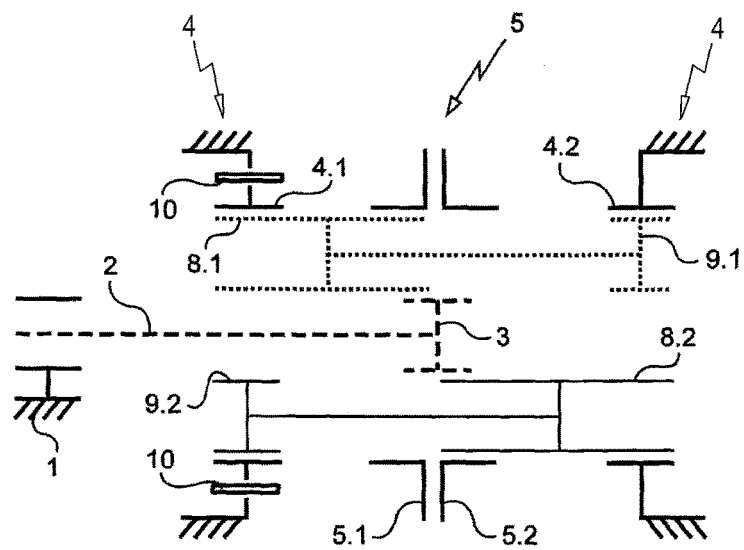
FIG. 6 is a kinematic diagram showing a device fitted with a backlash take-up member between two segments of the first ring, in a second variant of the backlash take-up member.

With reference to FIG. 6, the system includes a backlash take-up member in the form of a resilient member 10 rotatably connecting the segments 4.1 and 4.2 to each other.

By virtue of its resilience, the resilient annular element 10 applies torque between the segments 4.1 and 4.2 via the stationary frame so as to take up any backlash existing between the other components of the device in connection with the gearing.

Figure 7:
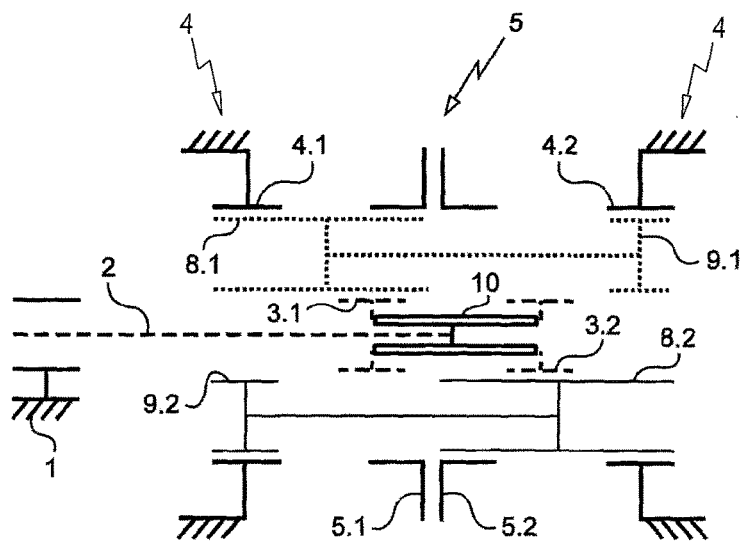
FIG. 7 is a kinematic diagram showing a device fitted with a backlash take-up member between the two segments of the sun gear, which has been split into two separate segments, in a first variant of the backlash take-up member.

With reference to FIG. 7, the sun gear 3 comprises a first segment 3.1 meshing with the first planets 8.1 and a second segment 3.2 meshing with the second planets 8.2. The system comprises a backlash take-up member in the form of a resilient element 10 rotatably connecting the two segments 3.1 and 3.2 of the sun gear 3 to each other. By virtue of its resilience, the resilient element 10 applies torque between the segments 3.1 and 3.2 via the shaft 2 so as to take up any backlash existing between the other components of the device in connection with the gearing.

The invention claimed is:

1. A gear device, comprising:
a shaft having a sun gear;
at least two coaxial rings with internal teeth, namely a first ring and a second ring, the second ring having at least a first annular segment and a second annular segment;
first planets, each provided with at least a first toothed segment engaging the sun gear, the first ring, and the first segment of the second ring; and
second planets, each provided with at least a first toothed segment engaging the sun gear, the first ring, and the second segment of the second ring;
wherein the sum of the number of teeth of the first ring plus the number of teeth of the sun gear is a number that is a multiple of the product of the number of first planets multiplied by the number of segments of the second ring;
wherein the sum of the number of teeth of either the first annular segment or the second annular segment of the second ring plus the number of teeth of the sun gear is a multiple of the number of first planets; and
wherein the first annular segment and the second annular segment have identical teeth and present between them an angular offset corresponding to a number of teeth that is the reciprocal of the number of segments of the second ring.

2. The device according to claim 1, wherein the first ring has a first annular segment and a second annular segment arranged on either side of the second ring, each planet being provided with a second toothed segment separated from the first toothed segment by a distance that is greater than the width of the first or second annular segments of the second ring with which the first toothed segment of each planet is not engaged, such that the first toothed segment of each of the first planets engages with the first annular segment of the first ring and with the first annular segment of the second ring, the second toothed segment of each of the first planets engages with the second annular segment of the first ring, the first toothed segment of each of the second planets engages with the second annular segment of the first ring and with the second annular segment of the second ring, and the second toothed segment of each of the second planets engages with the first annular segment of the first ring.

3. The device according to claim 1, wherein the second ring is movable relative to the frame and the first ring is stationary relative to the frame.

4. The device according to claim 1, wherein the second ring is stationary relative to the frame and the first outer ring is movable relative to the frame.

5. The device according to claim 1, wherein the planets are radially supported by rolling rings.

6. The device according to claim 1, wherein the planets are radially supported by idler gears.

7. The device according to claim 1, including a backlash take-up system.

8. The device according to claim 7, wherein the backlash take-up system comprises a resilient element rotatably connecting together the two segments of the second ring.

9. The device according to claim 7, wherein the backlash take-up system comprises a resilient element rotatably connecting together two segments of the sun gear, one of the two segments of the sun gear meshing with the first planets and the other meshing with the second planets.

10. The device according to claim 7, wherein the backlash take-up system comprises a resilient element rotatably connecting together two segments of the first ring.

* * * * *